United States Patent
Kim et al.

(10) Patent No.: US 10,386,893 B2
(45) Date of Patent: Aug. 20, 2019

(54) ELECTRONIC DEVICE WITH CRADLING FUNCTION

(71) Applicant: Samsung Electronics Co., Ltd., Gyeonggi-do (KR)

(72) Inventors: Iksang Kim, Seoul (KR); Bumsoo Park, Gyeonggi-do (KR); Hyunjune Yang, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/398,054

(22) Filed: Jan. 4, 2017

(65) Prior Publication Data
US 2017/0192455 A1   Jul. 6, 2017

(30) Foreign Application Priority Data
Jan. 4, 2016 (KR) .......... 10-2016-0000676

(51) Int. Cl.
*G06F 1/16* (2006.01)

(52) U.S. Cl.
CPC .......... *G06F 1/1669* (2013.01); *G06F 1/1628* (2013.01); *G06F 2200/1633* (2013.01)

(58) Field of Classification Search
CPC .......... G06F 1/1628; G06F 2200/1633; G06F 1/1654; G06F 1/1669; A45C 2200/15
See application file for complete search history.

(56) References Cited

U.S. PATENT DOCUMENTS

| | | | |
|---|---|---|---|
| 8,724,300 B2 | 5/2014 | Smith et al. | |
| 2012/0287562 A1* | 11/2012 | Wu | G06F 1/1626 361/679.01 |
| 2013/0031289 A1* | 1/2013 | Yeh | G06F 1/1632 710/303 |
| 2013/0242490 A1 | 9/2013 | Ku | |
| 2014/0036429 A1 | 2/2014 | Bryan et al. | |
| 2014/0071607 A1* | 3/2014 | Frinak | G06F 1/1624 361/679.09 |
| 2014/0347802 A1* | 11/2014 | Lee | G06F 1/1626 361/679.17 |
| 2015/0036273 A1* | 2/2015 | Hui | G06F 1/1654 361/679.08 |

(Continued)

FOREIGN PATENT DOCUMENTS

| | | |
|---|---|---|
| KR | 1020120086883 | 8/2012 |
| KR | 1020140133089 | 11/2014 |

OTHER PUBLICATIONS

Cameron Summerson, "Hands-on with Google's Official Nexus 9 Keyboard Folio: A Great Case, Subpar Keyboard", Dec. 22, 2014, 2 pages.

(Continued)

*Primary Examiner* — James Wu
(74) *Attorney, Agent, or Firm* — The Farrell Law Firm, P.C.

(57) ABSTRACT

An electronic device is provided which includes a first electronic device, an exterior cover including a first portion on which the first electronic device is mounted and a second portion folded one or more times to support a second electronic device in an inclined state, and a buttress disposed on a front face of the first electronic device, connected to the inclined second electronic device, and configured to support the inclined second electronic device.

19 Claims, 20 Drawing Sheets

(56) References Cited

U.S. PATENT DOCUMENTS

2016/0179142 A1* 6/2016 Liang .................... G06F 1/1656
                                                         361/679.17

OTHER PUBLICATIONS

International Search Report dated Apr. 11, 2017 issued in counterpart application No. PCT/KR2016/015197, 11 pages.
European Search Report dated Nov. 6, 2018 issued in counterpart application No. 16884033.8-1221, 10 pages.

* cited by examiner

ELECTRONIC DEVICE WITH CRADLING FUNCTION

PRIORITY

This application claims priority under 35 U.S.C. § 119(a) to Korean Patent Application Serial No. 10-2016-0000676, which was filed in the Korean Intellectual Property Office on Jan. 4, 2016, the entire content of which is incorporated herein by reference.

BACKGROUND

1. Field of the Disclosure

The present disclosure generally relates to an electronic device, and more particularly, to an electronic device which includes a cradling function.

2. Description of the Related Art

A user may mount an exterior cover on an electronic device (e.g., a smart phone or a tablet PC), which is carried by the user, in order to protect the electronic device. The exterior cover is detachably provided to the electronic device to protect the front face and/or the rear face of the electronic device.

Because the electronic device is often carried, damage, such as scratching, is frequently generated on the outer surface thereof. In order to avoid this problem, the electronic device is protected by the exterior cover. Because the electronic device includes a display and/or a touch screen positioned on the front face, the front face may be protected by the exterior cover.

When using the electronic device, it may be inconvenient to type or to view a displayed screen. For example, when the electronic device is used, in a mode in which inputting data is mainly performed using a stylus pen or a virtual keypad is used, maintaining the electronic device in a slightly inclined state (e.g., in a state where the electronic device is cradled to be inclined at an angle of about 15 degrees) may make the user's typing input operation more convenient.

In addition, in a mode in which the user views a displayed screen of the electronic device, maintaining the electronic device in a greatly inclined state (e.g., in the state where the electronic device is cradled to be inclined at an angle of about 65 or 70 degrees) may make the user's viewing more convenient.

In addition, an electronic device may provide stable portability to the user only when the front face of the electronic device, on which a display is disposed, is protected from the external environment when the electronic device is carried.

When an exterior cover used in the above-mentioned three modes is mounted on an electronic device, the user may use the electronic device more conveniently.

When the electronic device is in the slightly inclined state, it is convenient to perform typing on the electronic device, and when the electronic device is in the greatly inclined state, it is convenient to view a displayed screen. In order to reduce inconvenience, a separate portable cradle for an electronic device may be provided, or a cradle may be provided to an exterior cover of the electronic device.

An electronic device provided with a conventional exterior cover has problems in that an operation of switching the typing mode or the display viewing mode is inconvenient, and maintaining the typing mode or the display viewing mode is unstable. In particular, during the typing mode, the electronic device should not be in a moving or shaking state. When an electronic device provided with a conventional exterior cover is configured such that a data input device and a data output device are detachable, maintaining the typing mode or the display viewing mode may be unstable.

SUMMARY

An aspect of the present disclosure provides an electronic device in which data input and an exterior cover are integrated with each other.

Another aspect of the present disclosure provides an electronic device that provides a stable cradled state in a typing mode or a display viewing mode.

Another aspect of the present disclosure includes an electronic device that minimizes the rocking or movement of the electronic device by using a component protruding from the exterior surface in a typing mode or a display viewing mode.

Another aspect of the present disclosure provides an electronic device which includes a rotary buttress capable of maintaining a stable cradled state in a typing mode or a display viewing mode.

Another aspect of the present disclosure provides an electronic device in which, when an exterior case of the electronic device is made of a metallic material, a plurality of magnets are provided on the exterior cover so that the inclined cradled state of the electronic device may be stably supported.

According to an aspect of the present disclosure, an electronic device is provided which includes a first electronic device, an exterior cover including a first portion on which the first electronic device is mounted and a second portion that is folded one or more times so as to support a second electronic device in an inclined state, and a buttress disposed on a front face of the first electronic device, connected to the inclined second electronic device, and configured to support the inclined second electronic device.

According to an aspect of the present disclosure, an electronic device is provided which includes a keyboard, an electronic device including a display, an exterior cover including a first portion on which the keyboard is mounted and a second portion that is folded one or more times so as to support the electronic device in an inclined state, and a buttress rotatably exposed in an accommodation portion formed on the keyboard to maintain a connection state with the electronic device that is supported in the inclined state. When the electronic device is supported on the keyboard in the inclined state, at least one coupling structure may be provided between the electronic device and the second portion.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1A:
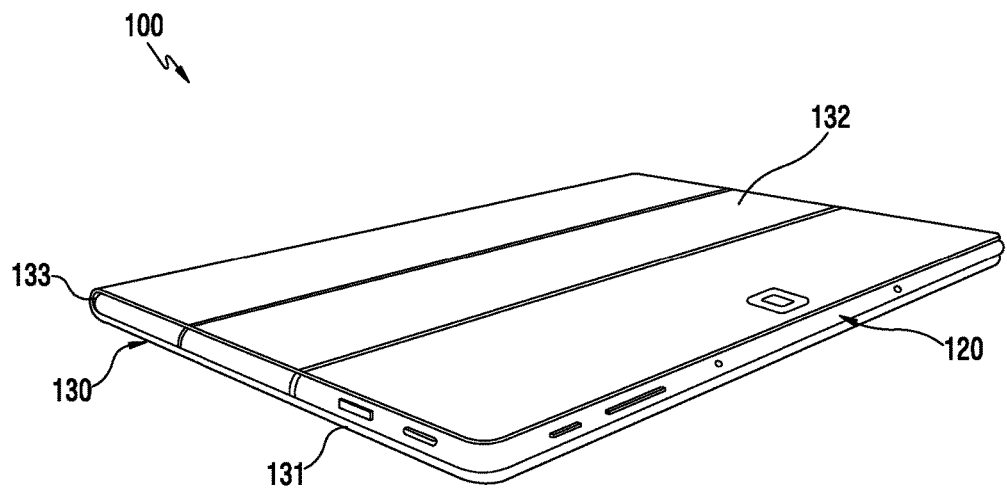
FIG. 1A is a perspective view illustrating an electronic device with a protective cover in a closed state, according to an embodiment of the present disclosure.

Hereinafter, embodiments of the present disclosure will be described with reference to the accompanying drawings. However, it should be understood that there is no limiting the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", or "one or more of A or/and B" may include all possible combinations of the items listed. For example, the expressions "A or B", "at least one of A and B", or "at least one of A or B" refer to all of (1) including at least one A, (2) including at least one B, or (3) including all of at least one A and at least one B.

Expressions such as "first", "second", and the like used in an embodiment of the present disclosure may modify various elements regardless of order or importance, and do not limit corresponding elements. The above-described expressions may be used to distinguish an element from another element. For example, a first user device and a second user device may indicate different user devices although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no elements (e.g., third element) interposed between them.

The expression "configured to" as used in the present disclosure may be used interchangeably with, for example, "suitable for", "having the capacity to", "designed to", "adapted to", "made to", or "capable of" according to the situation. The expression "configured to" may not necessarily mean "specially designed to" in terms of hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a general-purpose processor (e.g., central processing unit (CPU) or application processor (AP)) that may perform the corresponding operations by executing one or more software programs stored in a memory device.

The terms used herein are merely for the purpose of describing particular embodiments and do not limit the scope of other embodiments. As used herein, singular forms may include plural forms as well unless the context clearly indicates otherwise. Unless defined otherwise, all terms used herein, including technical terms and scientific terms, may have the same meaning as commonly understood by a person of ordinary skill in the art to which the present disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, even the term defined in the present disclosure should not be interpreted to exclude embodiments of the present disclosure.

Hereinafter, a embodiments of the present disclosure will be described with reference to the accompanying drawings. Hereinafter, a configuration of an electronic device 100 having a cradling function, according to an embodiment of the present disclosure, will be described with reference to the accompanying drawings. For example, an electronic device 100 (such as a tablet PC) that is provided with an exterior cover as an accessory such that the electronic device 100 may be cradled at various inclined angles.

FIG. 1A is a perspective view illustrating an electronic device with an exterior cover in a closed state, according to an embodiment of the present disclosure.

Figure 1B:
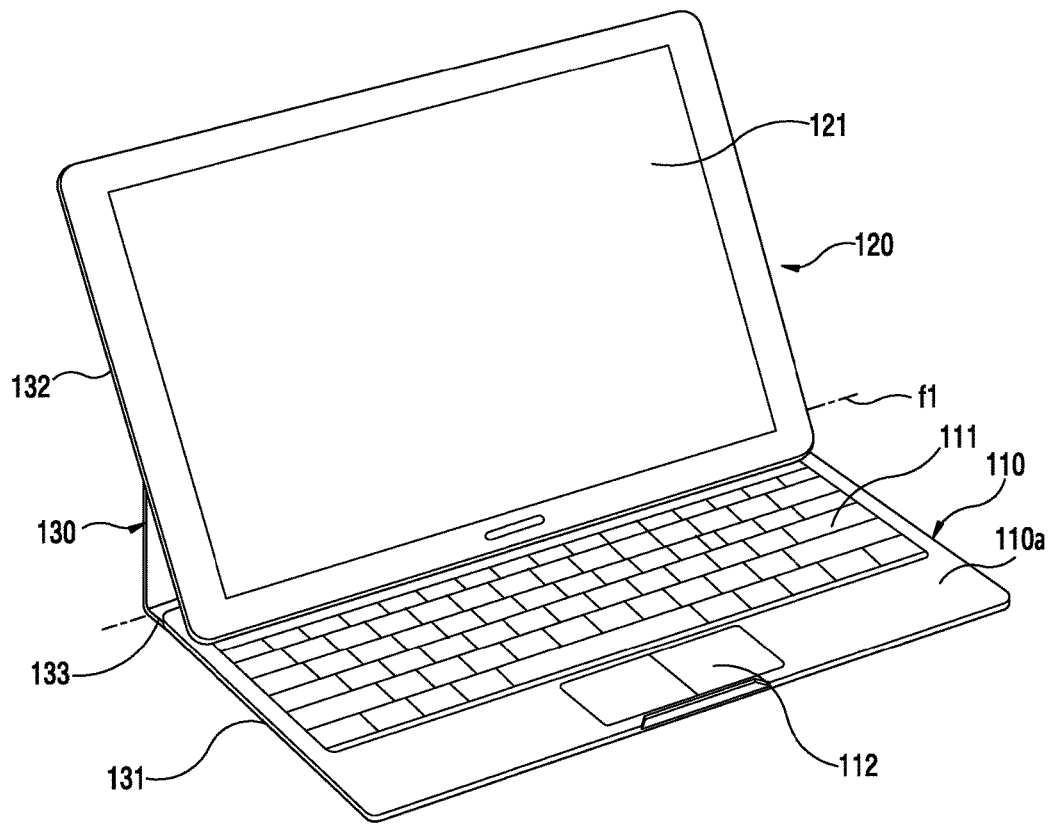
FIG. 1B is a perspective view illustrating an electronic device in a display viewing mode, according to an embodiment of the present disclosure.

FIG. 1B is a perspective view illustrating an electronic device cradled in a display viewing mode, according to an embodiment of the present disclosure.

Figure 1C:
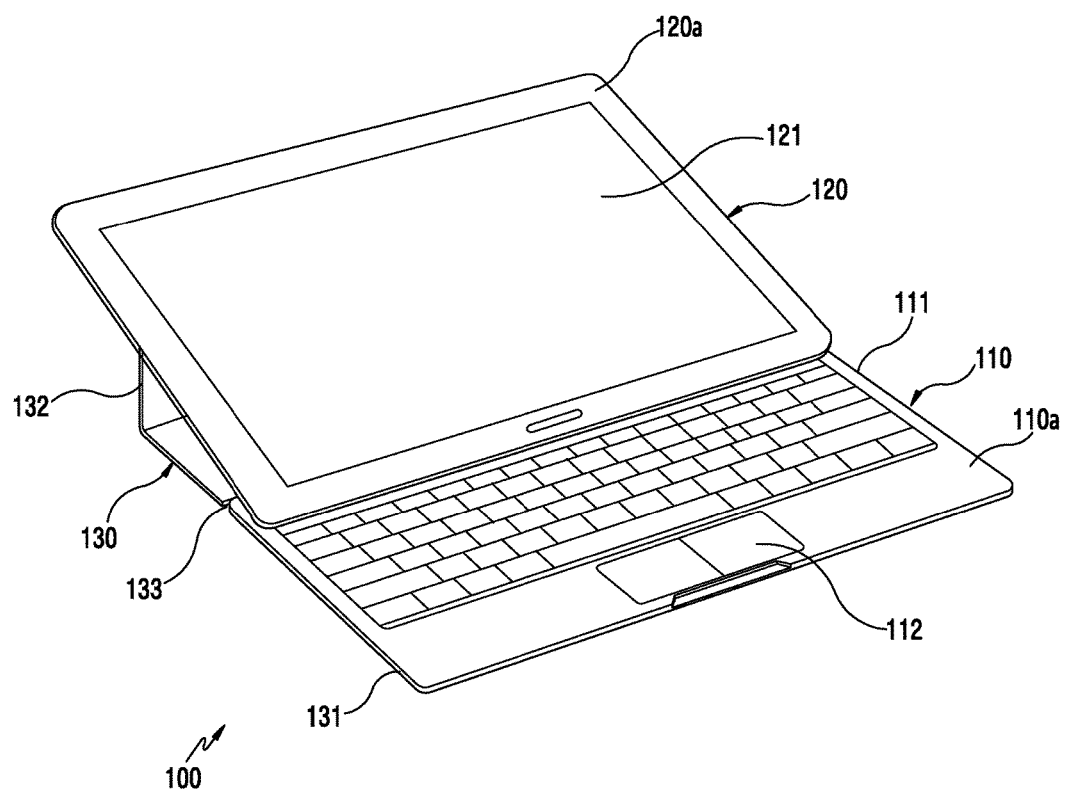
FIG. 1C is a perspective view illustrating an electronic device in a typing mode, according to an embodiment of the present disclosure.

FIG. 1C is a perspective view illustrating an electronic device cradled in a typing mode, according to an embodiment of the present disclosure.

Referring to FIGS. 1A to 1C, an exterior cover 130 is a cover provided to a first electronic device 110 to be carried together with the first electronic device 110. The exterior cover 130 is able to protect the external appearance of the electronic device 100 and to support a second electronic device 120 to be inclined.

According to an embodiment of the present disclosure, the electronic device 100 may refer to a portable and slim electronic device that is provided with an exterior cover 130 to protect or cradle the first and second electronic devices 110 and 120. The electronic device 100 may refer to a miniaturized and slim mobile communication device. The first electronic device 110 may be a data input device, such as a keyboard. The second electronic device 120 may include a mobile phone, a palm sized personal computer (PC), a personal communication system (PCS), a personal digital assistant (PDA), a hand-held PC (HPC), a smart phone, a wireless local area network (LAN) terminal, a laptop computer, a netbook computer, a notebook computer, a tablet PC, and the like.

An electronic device, according to an embodiment of the present disclosure, will be described below assuming that the first electronic device 110 is a keyboard and the second electronic device 120 is a tablet PC.

According to an embodiment of the present disclosure, the electronic device 100 may include the first electronic device 110, the second electronic device 120, an exterior cover 130, and a buttress. Each of the first and second electronic devices 110 and 120 may be mounted on, or separated from, the exterior cover 130. The first electronic device 110 may be a data input device, and the second electronic device 120 may be a data output device (e.g., a display).

According to an embodiment of the present disclosure, the first electronic device 110 includes, on an inner face 110a thereof, a buttress, a plurality of keys 111, and an input touchpad 112.

According to an embodiment of the present disclosure, the second electronic device 120 includes, on the front face thereof, a display 121 or a touch screen that enables a touch input, and may be protected and supported to be inclined by the exterior cover 130. When the second electronic device 120 is provided with the touch screen on the front face, an input may be made on the second electronic device 120 through a touch of a finger, a stylus pen, and the like, to be processed by the second electronic device 120. The display may be a large screen display, and may be provided with a touch sensitive panel to operate as a touch screen. Hereinafter, the display will be referred to as a touch screen.

The touch screen 121 may occupy a great portion of the front face of the second electronic device 120. According to an embodiment of the present disclosure, when the electronic device 120 has several pages of home screens, the main home screen may be the first home screen among the several pages of home screens. The home screen may display shortcut icons to execute frequently used applications, a main menu switching key, time, weather, and the like. The main menu switching key causes the main screen to be displayed on the touch screen 121. On the upper end of the touch screen 121, status bars may be formed to indicate the status of the electronic device 100, such as a battery charge status, the strength of a received signal, and the current time. A home button, a menu button, a back button, and the like, may be disposed below the touch screen 121.

The home button may cause the main home screen to be displayed on the touch screen 121. When the home button is touched while applications are being executed on the touch screen 121, the main home screen may be displayed on the touch screen 121. The home button may be used to cause the touch screen 190 to display the most recently used application or a task manager.

The menu button may provide a menu that may be used on the touch screen 121. The menu may include a widget addition menu, a background screen change menu, a retrieve menu, an edition menu, an environment setting menu, and the like. The back button may cause the screen, which was executed just prior to the currently executed screen, to be displayed, or may cause the most recently used application to be terminated.

According to an embodiment of the present disclosure, a first camera, an illuminance sensor, and a proximity sensor may be arranged on an edge of the front face of the second electronic device 120. A second camera, a flash, and a speaker may be disposed on the rear face of the second electronic device 120.

For example, a power/reset button, a volume button, a terrestrial digital multimedia broadcast (DMB) antenna for broadcasting reception, one or more microphones, and the like, may be arranged on the side faces of the second electronic device 120. In addition, a connector may be arranged on the lower end side face of the second electronic device 120. The connector may be formed with a plurality of electrodes, and may be connected to an external device via a wire. An earphone connecting jack may be arranged on the upper end side face of the second electronic device 120. An earphone may be inserted into the earphone connecting jack. The earphone connecting jack may be arranged on the lower end side face of the second electronic device 120. Components related to the connected exterior are not illustrated, except for a protruding exterior member.

According to an embodiment of the present disclosure, the exterior cover 130 is a cover that provides a protection function and a cradling function, and includes a first portion 131, a second portion 132, and a connection portion 133 that interconnects the first and second portions 131 and 132. The exterior cover 130 may be referred to as a tablet cover in view of the fact that the exterior cover 130 is adopted as a front cover of the tablet PC, and may also be referred to as a display cover in view of the fact that the exterior cover 130 protects a display of the tablet PC.

According to an embodiment of the present disclosure, the first electronic device 110 may be mounted on the first portion 131 of the exterior cover 130, and the second portion 132 of the exterior cover 130 is folded one or more times to support the second electronic device 120 in an inclined manner. The first portion 131 may be referred to as a rear cover in view of the fact that the first portion 131 is positioned on the rear face of the first electronic device 110, and the second portion 132 may be referred to as a front cover in view of the fact that the second portion 132 is positioned on the upper face of the second electronic device 120. The first portion 131 and/or the second portion 132 may be made of a rigid material or a flexible material. The first portion 131 may be made of a synthetic resin, and the second portion 132 may have an exterior surface that may be made of a flexible material (e.g., leather or a material that provides a leather-like feeling).

According to an embodiment of the present disclosure, as the single cover is folded along a first folding axis f1, the first and second portions 131 and 132 may cover the rear face of the first electronic device 110 and the front face of the second electronic device 120, respectively. The first and second portions 131 and 132 may be an integrally connected cover, or may be configured as separated covers, which may be connected to each other with a flexible material, a hinge, and the like. The connecting portion 133, which interconnects the first and second portions 131 and 132, may be made of a flexible material to provide flexing along the first folding axis f1.

According to an embodiment of the present disclosure, the first portion 131 may be configured in a base structure type such that the first electronic device 110 is attachable to/detachable from the first portion 131. The first electronic device 110 may be separated from the first portion 131. Alternatively, the first electronic device 110 may be coupled to the first portion 131 using a fastener.

FIG. 1B illustrates the electronic device 100 in the display viewing mode in which the second electronic device 120 may be supported on the first electronic device 110 and is inclined at an angle of about 70 degrees using the second portion 132 and the buttress. FIG. 1C illustrates the electronic device 100 in the typing mode in which the second electronic device 120 may be supported on the first electronic device 110 inclined at an angle of about 15 degrees using the second portion 132 and the buttress.

Figure 2A:
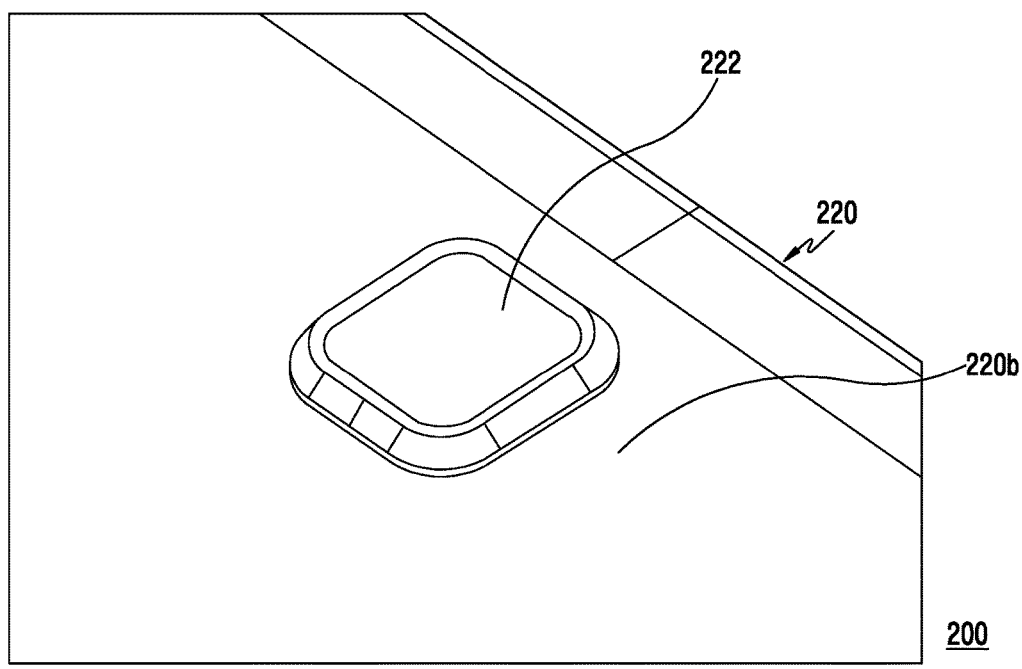
FIG. 2A is a perspective view illustrating a protruding type component disposed on an outer face of an electronic device, according to an embodiment of the present disclosure.

FIG. 2A is a perspective view illustrating a protruding type component disposed on an outer face of an electronic device, according to an embodiment of the present disclosure.

Figure 2B:
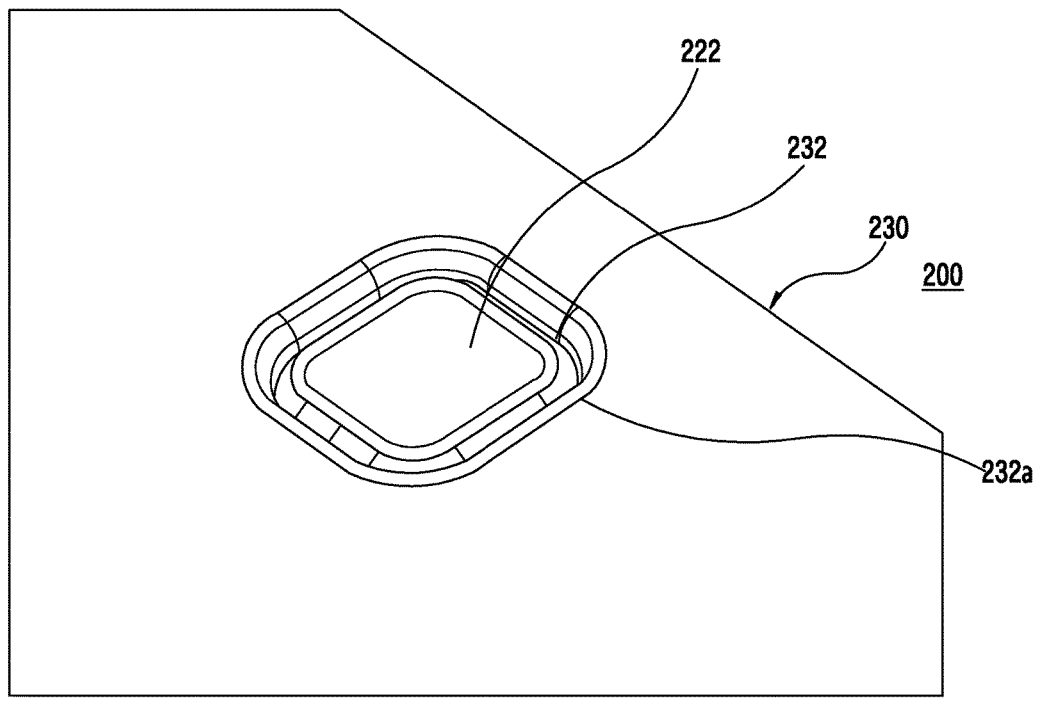
FIG. 2B is a perspective view illustrating a state in which an opening of an exterior cover is fitted on a protruding type component of an electronic device, according to an embodiment of the present disclosure.

FIG. 2B is a perspective view illustrating a state in which an opening of an exterior cover is fitted on a protruding type component of an electronic device, according to an embodiment of the present disclosure.

Figure 2C:
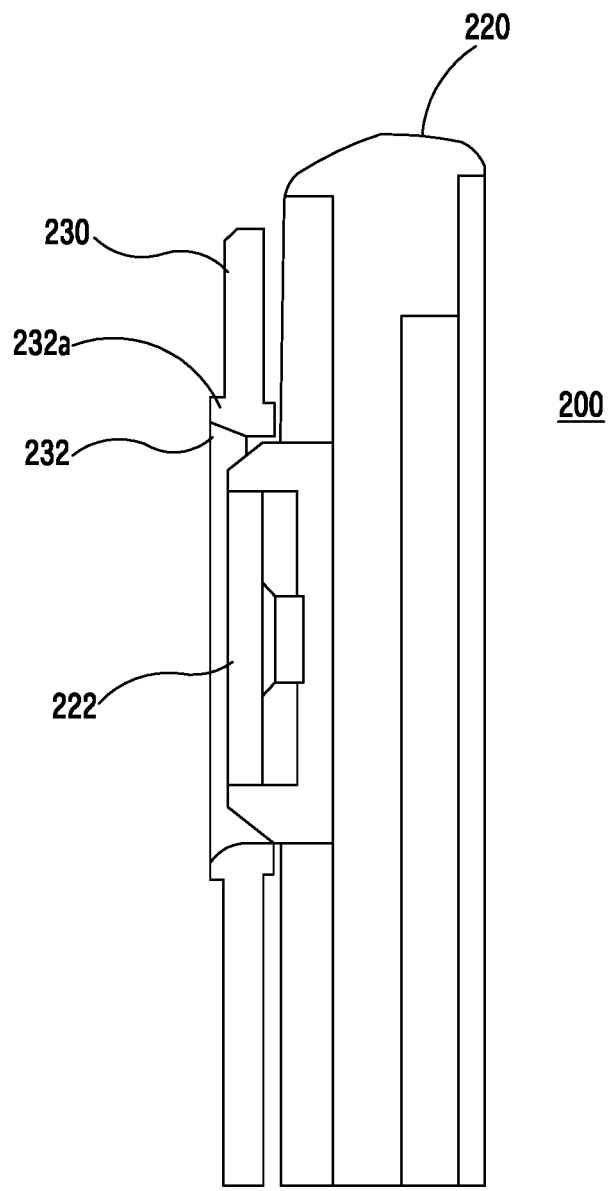
FIG. 2C is a cross-sectional view illustrating a state in which the opening of an exterior cover is fitted on a protruding type component of an electronic device, according to an embodiment of the present disclosure.

FIG. 2C is a cross-sectional view illustrating a state in which the opening of the exterior cover is fitted on a protruding type component of an electronic device, according to an embodiment of the present disclosure.

Referring to FIGS. 2A to 2C, an electronic device 200, according to an embodiment of the present disclosure, may be the same as the electronic device 100 illustrated in FIGS. 1A to 1C. The electronic device 200 may include a protruding type exterior component 222 that is disposed on the rear face 220b of a second electronic device 220. The protruding type exterior component 222 may be an optical component, a camera component, or a rear camera. The protruding type exterior component 222 may be in a shape protruding with a predetermined height from the rear face 220b.

According to an embodiment of the present disclosure, an exterior cover 230 may include an opening 232, into which the protruding type exterior component 222 is inserted, is formed in a second portion 232 coupled with the rear face 220b of the second electronic device 220. The opening 232 is formed in a hole shape that corresponds to the shape of the protruding type exterior component 222. The opening 232 may be formed to have a size that is substantially equal to, or slightly larger than, that of the protruding type exterior component 222. When the second electronic device 220 is mounted on the exterior cover 230, the opening 232 may determine the coupling position between the exterior cover 230 and the second electronic device 220.

According to an embodiment of the present disclosure, the coupling structure between the opening 232 and the protruding type exterior component 222 may fix the inclined and cradled state of the second electronic device 220 in the typing mode or the display viewing mode. In the typing mode, the coupling structure is responsible for minimizing the movement of the cradled second electronic device 220.

According to an embodiment of the present disclosure, the opening 232 may further include an accessory 232a that is provided along the inner periphery thereof. The accessory 232a may be made of a metallic material, and may be coupled to be in close contact with the protruding type exterior component 222.

Figure 3A:
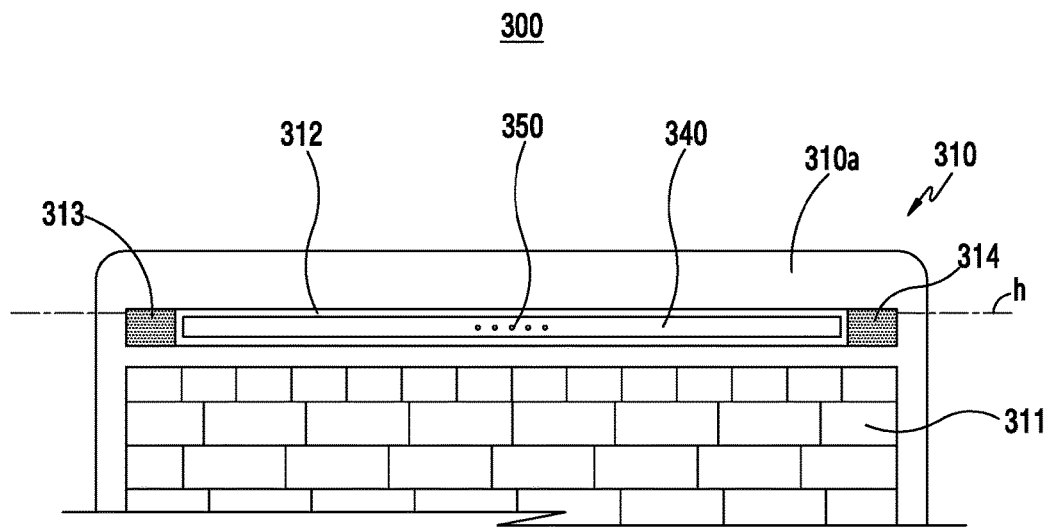
FIG. 3A is a view illustrating a portion of an upper face of an electronic device, according to an embodiment of the present disclosure.

FIG. 3A is a view illustrating a portion of an upper face of an electronic, device according to an embodiment of the present disclosure.

Figure 3B:
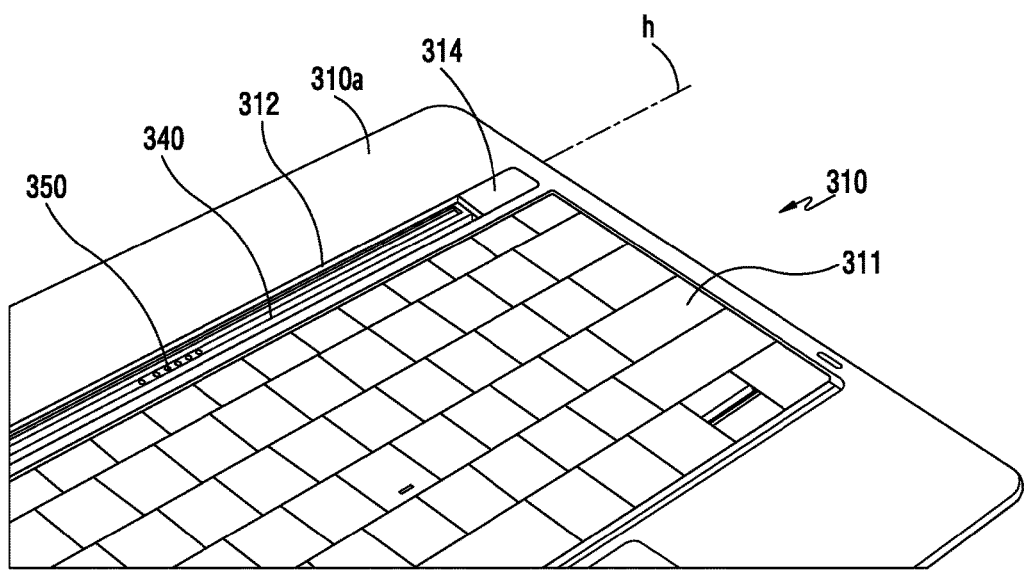
FIG. 3B is a perspective view illustrating a portion of an upper face of an electronic device, according to an embodiment of the present disclosure.

FIG. 3B is a perspective view illustrating a portion of the upper face of an electronic device, according to an embodiment of the present disclosure.

Referring to FIGS. 3A and 3B, an electronic device 300 includes a keyboard 311 and a buttress 340 that are disposed on the inner face 310a of a first electronic device 310.

According to an embodiment of the present disclosure, the buttress 340 may be disposed in an accommodation portion 312 formed on the inner face 310a of the first electronic device 310, and may be mounted to be rotatable about an hinge axis h that is spaced apart from the first folding axis f1 in parallel to the first folding axis f1. The accommodation portion 312 may be configured as a groove shape or a recessed shape on the inner face of the first electronic device. The accommodation portion 312 is spaced apart from the first folding axis f1, and may extend linearly in the direction parallel to the first folding axis f1.

According to an embodiment of the present disclosure, the buttress 340 disposed in the accommodation portion 312 has a linearly extending bar shape, and may include a first face and a second face that is opposite to the first face. The first face of the buttress 340 may be a face that is exposed to the outside, and the second face of the buttress 340 may be a face that is not exposed to the outside. The buttress 340 is capable of supporting the inclined second electronic device in a state of being in close contact with the lower end of the second electronic device.

According to an embodiment of the present disclosure, the buttress 340 may include a connection device 350. The connection device 350 may include a connection module. The connection device 350 may include an elastically movable connection terminal (e.g., a pogo pin) that is disposed on the first face of the buttress 340. The connection device 350 may be electrically connected with each of the first and second electronic devices. The connection device 350 may be stably and electrically connected with the inclined and cradled second electronic device.

According to an embodiment of the present disclosure, the electronic device 300 includes first and second elastic units 313 and 314 to be interlocked with the buttress 340 disposed within the accommodation portion 312. The first and second elastic units 313 and 314 may be made of a highly elastic rubber material, and may be mounted on the opposite ends of the accommodation portion 312 to be interlocked with one end and/or both ends of the buttress 340 according to the rotation of the buttress 340. The interlocked structure between the first and second elastic units and the buttress will be described below. As the second electronic device is supported to be inclined according to the coupling structure between the buttress 340 and the first and second elastic units 313 and 314, the rocking and movement of the second electronic device may be minimized, and the connection state of the second electronic device may be stably maintained. The coupling structure between the first and second elastic units and the buttress will be described below.

Figure 4:
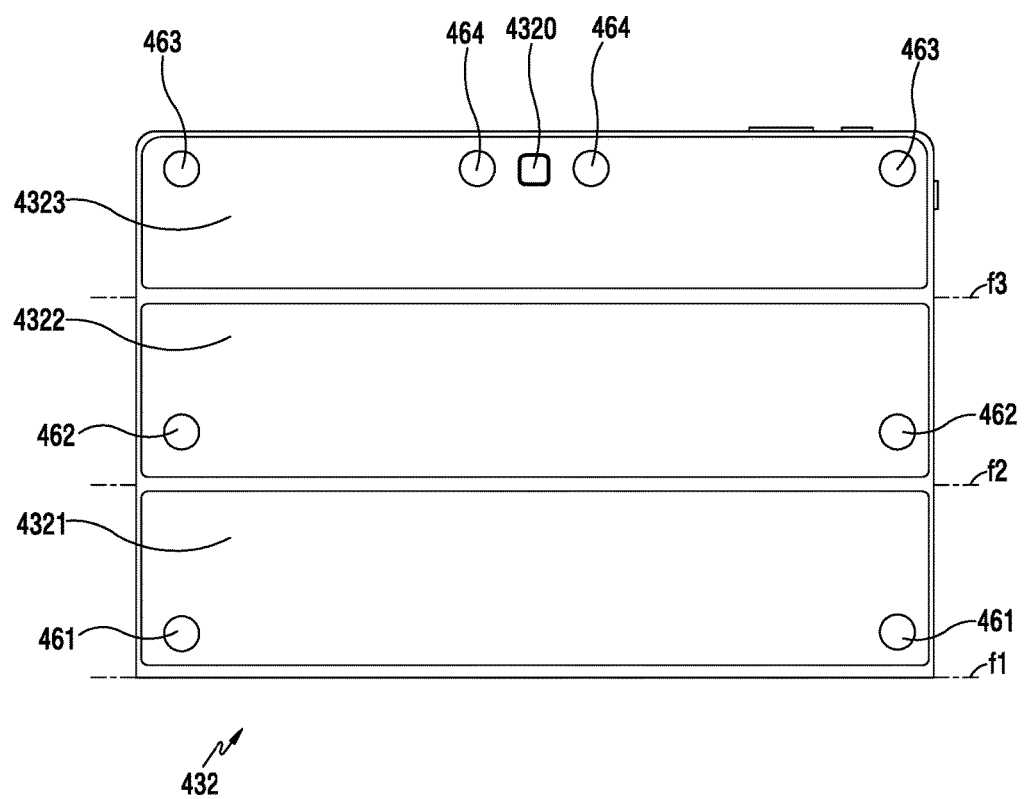
FIG. 4 is a front view illustrating a second portion of an exterior cover, according to an embodiment of the present disclosure.

FIG. 4 is a front view illustrating a second portion of an exterior cover, according to an embodiment of the present disclosure.

Referring to FIG. 4, the second portion 432 of the exterior cover may support the second electronic device in various modes. The second portion 432 may have a size that substantially faces the rear face and the front face of each of the first and second electronic devices.

According to an embodiment of the present disclosure, the second portion 432 may be divided into a plurality of regions. When the second portion 432 is divided into three regions, the second portion 432 may include first to third supports 4321 to 4323. However, the second portion 432 may be divided into four or more regions as needed.

According to an embodiment of the present disclosure, the second portion 432 may include second and third folding axes f2 and f3, each of which is parallel to the direction of the first folding axis f1, and may include first to third supports 4321 to 4323 that are divided by the second and third folding axes f2 and f3. That is, the first and third supports 4321 and 4323 may be folded along the second and third folding axes f2 and f3, respectively. The first support 4321 may be folded about the first folding axis f1. Each of the first to third supports 4321 to 4323 may be made of a rigid material, and may be configured in a rectangular plate shape having a substantially thin thickness. Each of the first to third supports 4321 to 4323 may be configured to have substantially the same area, or may be configured to have substantially different areas, respectively. As will be described later, in order to enable the cradled angle to be changed in various cradling modes of the electronic device, the first to third supports 4321 to 4323 may be configured to have different areas, respectively. A portion between the first and second supports 4321 and 4322 and a portion between the second third supports 4322 and 4323 may be formed to be thin such that the thin portions may serve as the second and third folding axes f2 and f3. The second and third folding axes f2 and f3 may include a flexible material.

In addition, each of the first to third supports 4321 to 4323, which are made of a rigid material, may also serve as a buttress that supports the second electronic device to be inclined. However, each of the first to third supports 4321 to 4323 may be made of a flexible plate material that is capable of being curved.

According to an embodiment of the present disclosure, the electronic device may include a plurality of magnets that are mounted on the second portion 432. Each of the magnets may generate a pulling force (attraction) with another magnet with a different polarity or a metal portion, and based on this magnetic property, it is possible to provide a force for cradling and fixing the second electronic device that is supported to be inclined. When the exterior case of the electronic device is made of a metallic material, the exterior case of the electronic device may provide a force to be coupled with the magnets.

According to an embodiment of the present disclosure, in the second portion, first magnets 461 may be disposed in the vicinity of the opposite end regions of the first support 4321. The first magnets 461 may be mounted on corner regions at the lower sides of the opposite ends of the first support 4321 (substantially at the lower opposite sides of the first support 4321), respectively, and may be coupled to the rear face of the second electronic device by magnetic force.

According to an embodiment of the present disclosure, second magnets 462 may be disposed in the vicinity of the opposite end regions of the second support 4322. The second magnets 462 may be mounted on corner regions at the lower sides of the opposite ends of the second support 4322 (substantially at the lower opposite sides of the second support 4322), respectively, and may be coupled to the rear face of the second electronic device by magnetic force.

According to an embodiment of the present disclosure, third magnets 463 may be disposed in the vicinity of the opposite end regions of the third support 4323. The third magnets 463 may be mounted on corner regions at the lower sides of the opposite ends of the third support 4323 (substantially at the lower opposite sides of the third support 4323), respectively, and may be coupled to the rear face of the second electronic device by magnetic force. In addition, fourth magnets 464 may be further disposed at the opposite sides of the opening 4320. The fourth magnets 464 may be coupled to the rear face of the second electronic device such that the coupling state between the protruding type exterior component and the opening may be stably maintained. Fifth and sixth magnets may be disposed in the central portions of the first to third supports.

Figure 5:
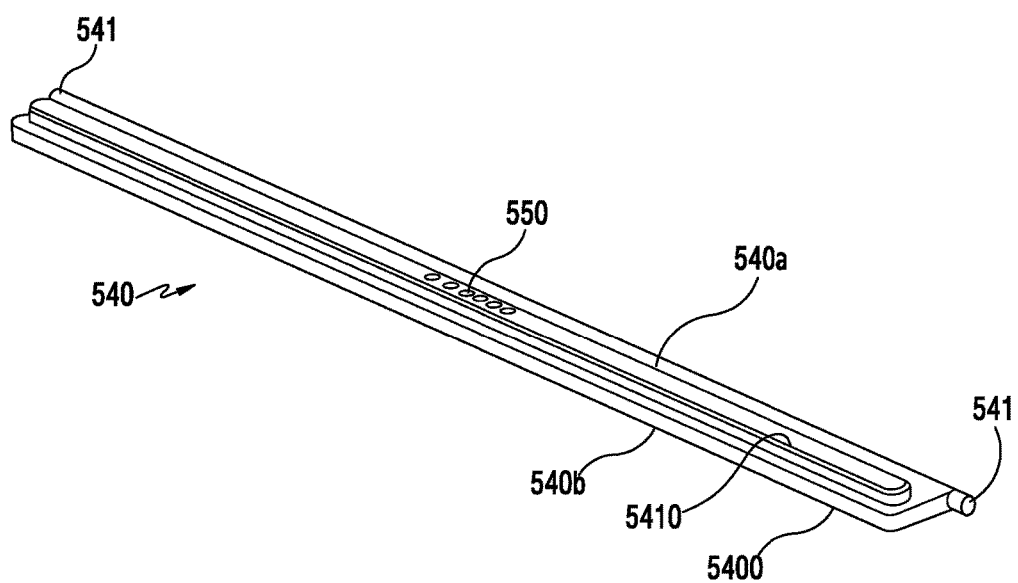
FIG. 5 is a perspective view illustrating a first face of a buttress, according to an embodiment of the present disclosure.

FIG. 5 is a perspective view illustrating a first face of a buttress, according to an embodiment of the present disclosure.

Referring to FIG. 5, a buttress 540 may be the same as buttress 340 illustrated in FIGS. 3A and 3B. The buttress 540 may include a bar-shaped support body 5400 and hinge projections 541 that are formed on the opposite ends of the support body 5400, respectively. The hinge projections 541 may provide a hinge axis of the buttress 540.

The buttress 540 includes a first face 540a and a second face 540b that is opposite to the first face 540a. The first face 540a may be an outer face or a top face, and the second face 540b may be an inner face or a bottom face. The buttress 540 may include a protruding portion 5410 that is formed on the support body 5400 to extend in the longitudinal direction, and a connection device 550 may be disposed at the central point of the protruding portion 5410. The connection device 550 may include a plurality of connection terminals. The connection terminals may be configured to be elastically movable.

Figure 6:
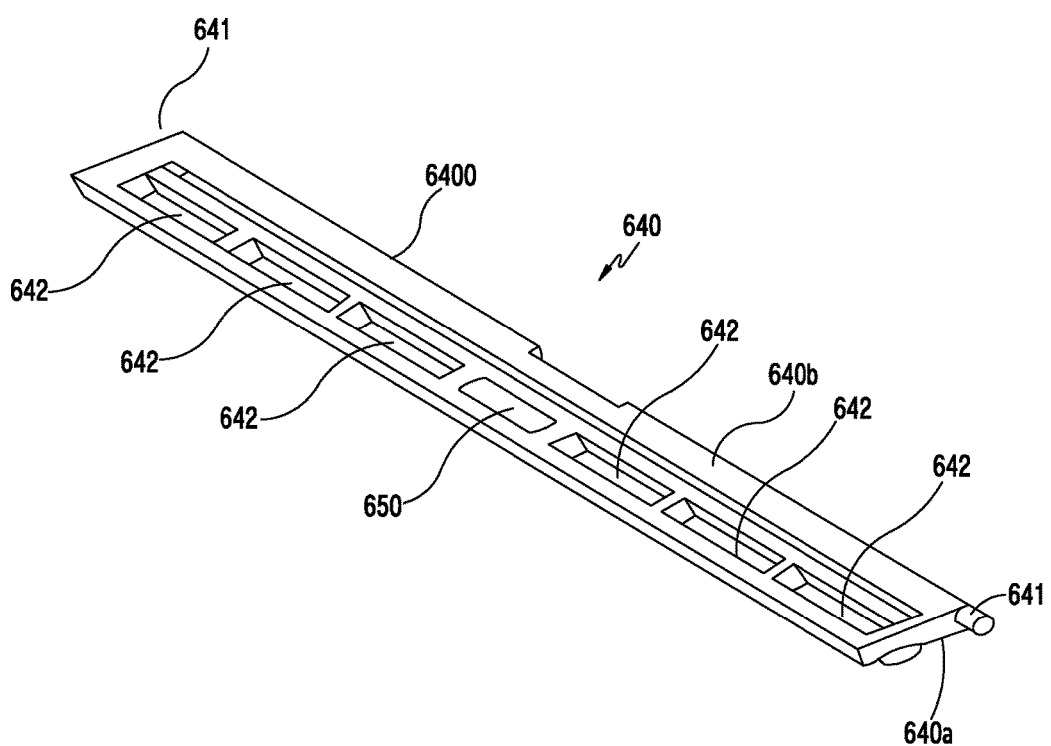
FIG. 6 is a perspective illustrating a second face of a buttress, according to an embodiment of the present disclosure.

FIG. 6 is a perspective illustrating a second face of a buttress, according to an embodiment of the present disclosure.

Referring to FIG. 6, a buttress 640 may be the same as the buttress 340 illustrated in FIGS. 3A and 3B.

According to an embodiment of the present disclosure, the buttress 640 includes a bar-shaped support body 6400 and hinge projections 641 that are formed on the opposite ends of the support body 6400, respectively. The hinge projections 641 may provide a hinge axis of the buttress 640.

The buttress 640 includes a first face 640*a* and a second face 640*b* that is opposite to the first face 640*a*. The buttress 640 may include a connection device 650 that may be disposed at the central point thereof. The connection device 650 may include a plurality of connection terminals. The connection terminals may be elastically movable.

According to an embodiment of the present disclosure, the buttress 640 includes a plurality of magnet mounting recesses 642 on the second face 640*b* in order to mount a plurality of magnets in the magnet mounting recesses 642, respectively. The magnet mounting recesses 642 may be symmetrically arranged at opposite sides of the connection device 650 at regular intervals. The magnets mounted in the magnet mounting recesses 642 may be coupled to a metal sheet in order to minimize the rocking or movement of the buttress in the accommodation recess.

Figure 7A:
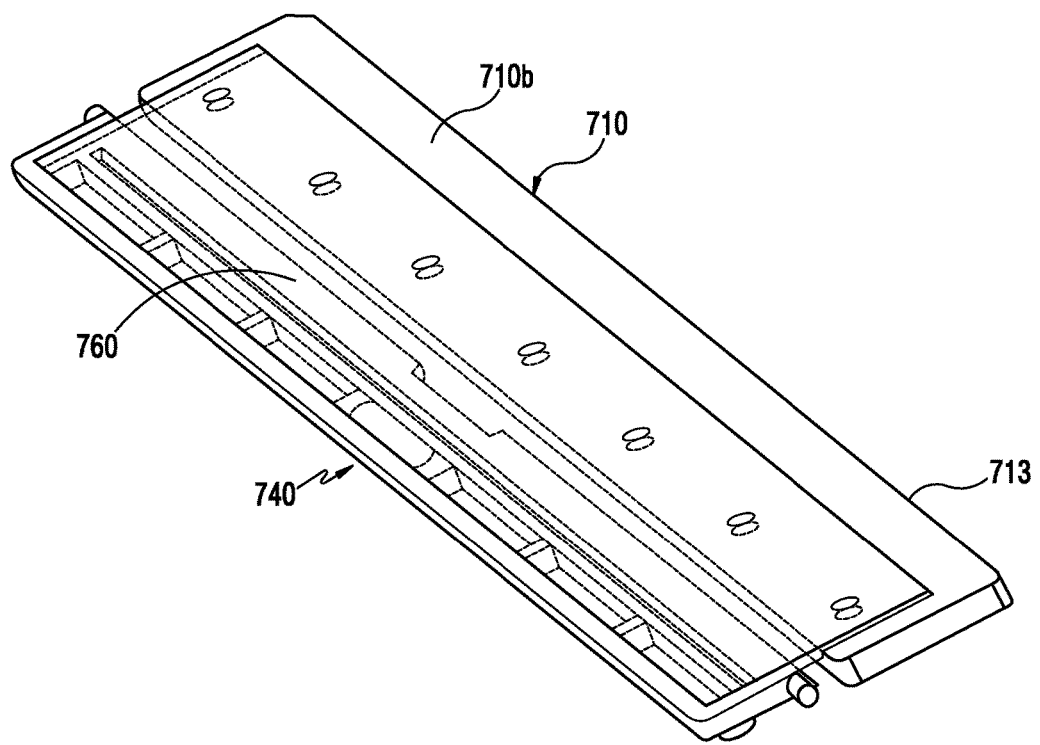
FIG. 7A is a perspective view illustrating a state in which a buttress and a connection member are connected to each other, according to an embodiment of the present disclosure.

FIG. 7A is a perspective view illustrating a state in which a buttress and a connection member are connected to each other, according to an embodiment of the present disclosure.

Figure 7B:
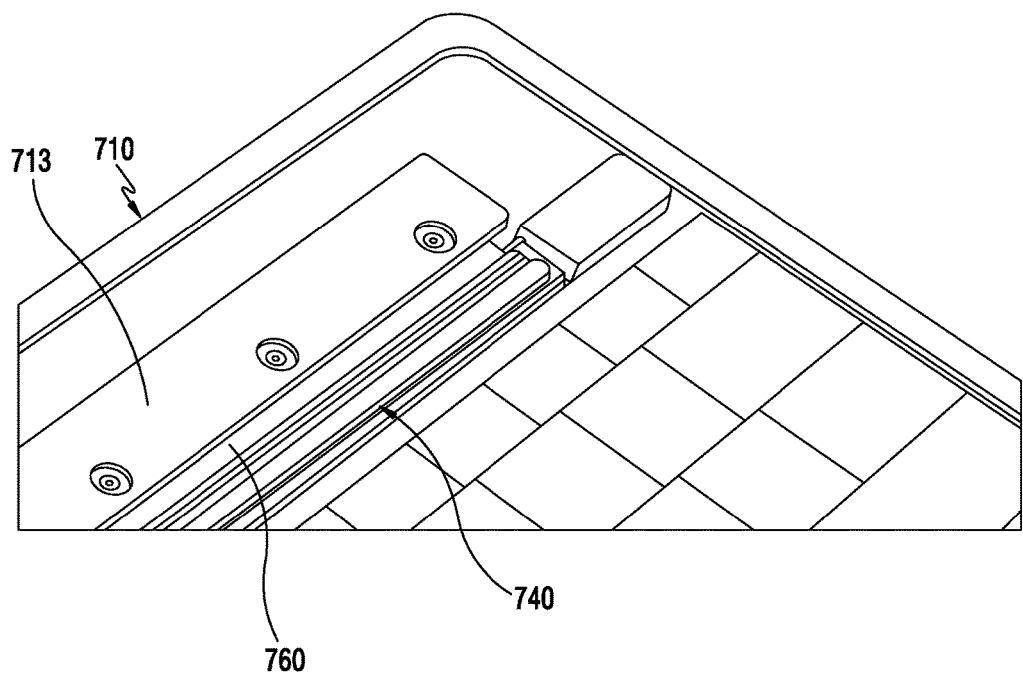
FIG. 7B is a perspective view illustrating a portion of a first electronic device to which a buttress and a connection member are connected in a state in which an inner case is removed, according to an embodiment of the present disclosure.

FIG. 7B is a perspective view illustrating a portion of a first electronic device to which the buttress and the connection member are connected in a state in which an inner case is removed, according to an embodiment of the present disclosure.

Referring to FIGS. 7A and 7B, a buttress 740 may be connected to a structure 713 of a second electronic device 710 by a connection member 760. One side region of the connection member 760 is fixed to cover the magnet mounting part of the second face of the buttress 740, and the other side region may be fixed to a structure 713 of the inner face 710*b* of the first electronic device 710.

According to an embodiment of the present disclosure, the buttress 740 may reduce the rotational sensitivity by the connection device 760. When the buttress 740 is rotated, a force required to rotate may be offset by the connecting member 760, thereby reducing the rotational sensitivity providing a soft feel to the rotation of the buttress 740.

Figure 8A:
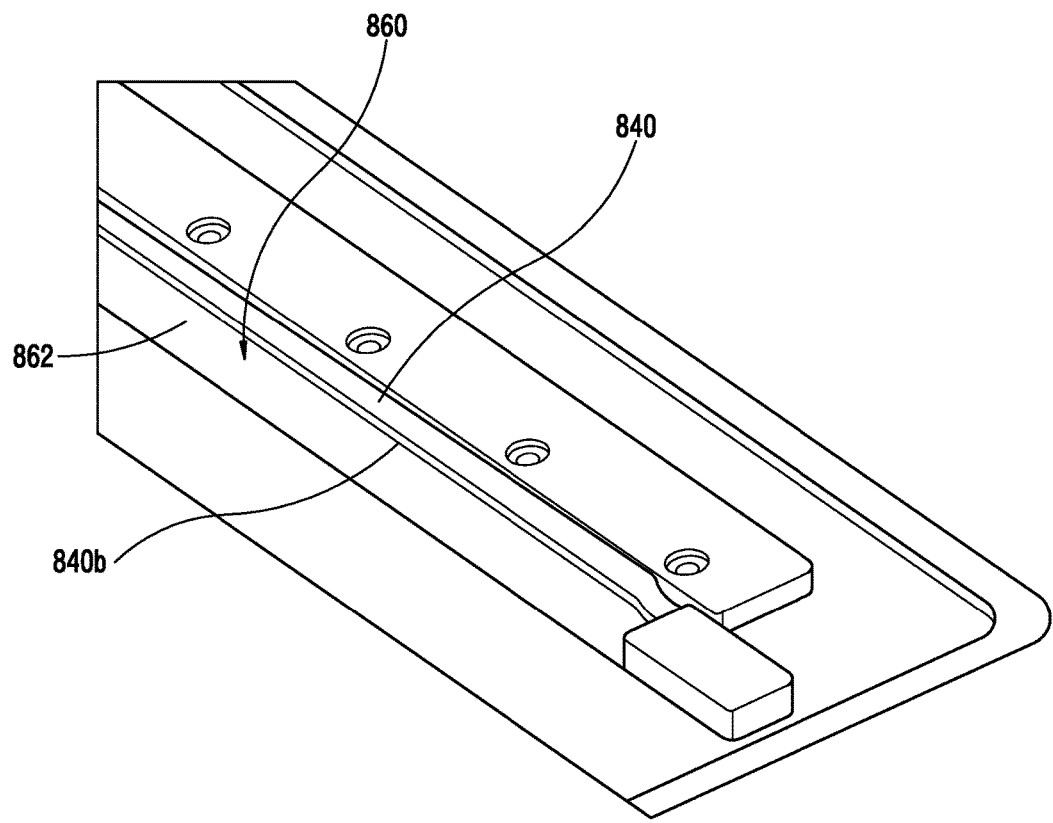
FIG. 8A is a perspective view illustrating a state in which a metal sheet is disposed on the bottom of a buttress, according to an embodiment of the present disclosure.

FIG. 8A is a perspective view illustrating a state in which a metal sheet is disposed on the bottom of a buttress, according to an embodiment of the present disclosure.

Figure 8B:
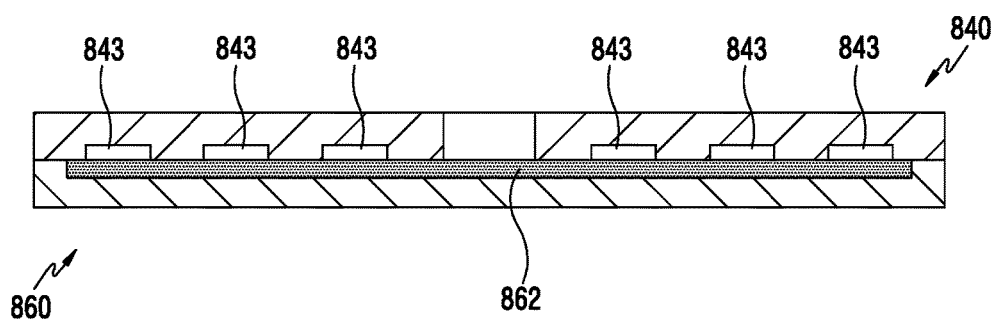
FIG. 8B is a cross-sectional view illustrating a state in which a buttress is coupled to a metal sheet, according to an embodiment of the present disclosure.

FIG. 8B is a cross-sectional view illustrating a state in which the buttress is coupled to the metal sheet, according to an embodiment of the present disclosure.

Referring to FIGS. 8A and 8B, a connection member 860 includes a metal sheet 862. The metal sheet 862 may be provided to the connection member 860 through an insert injection molding process. The metal sheet 862 may be maintained in close contact with the second face 842 of the buttress 840. A coupling force between the magnets 843 of the buttress 840 and the metal sheet 862 may be provided. The coupled state between the magnets 843 and the metal sheet 862 is illustrated in FIG. 8B. The movement of the accommodated buttress 840 may be prevented by the coupled state between the magnets 843 and the metal sheet 862.

Figure 9A:
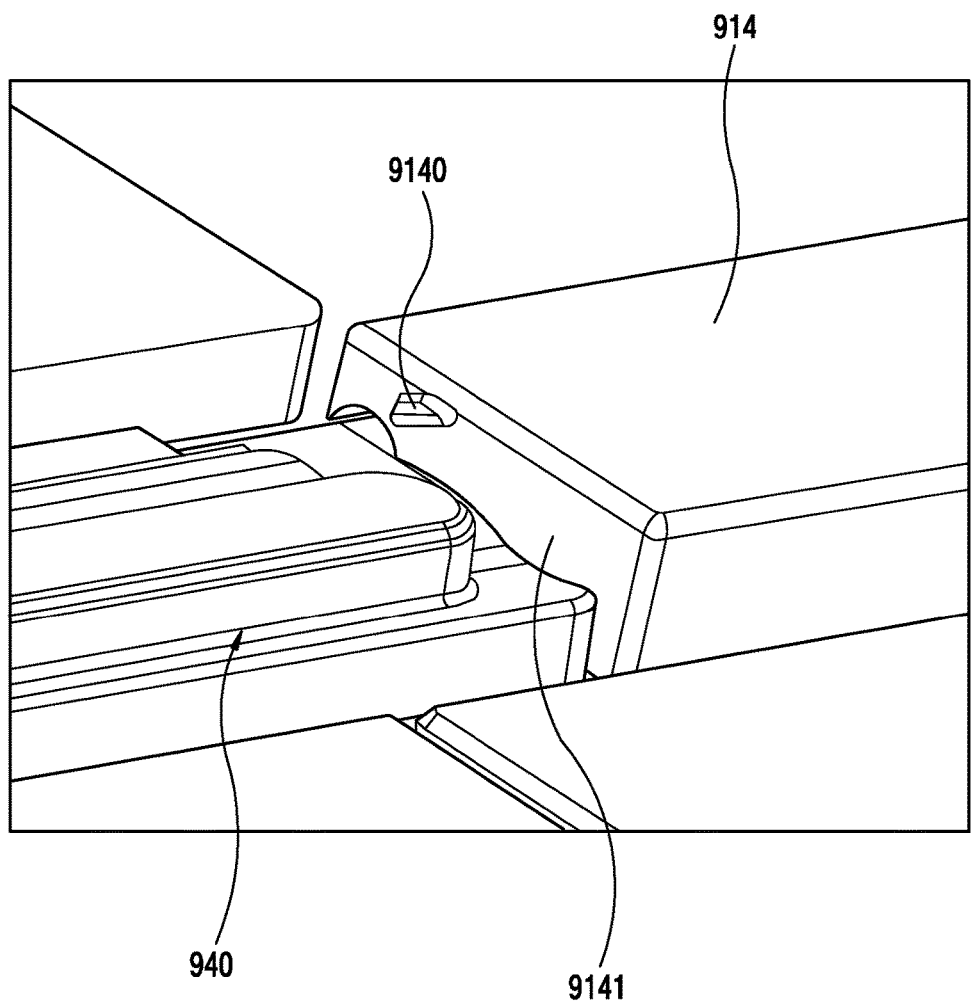
FIG. 9A is a perspective view illustrating a coupling protrusion of an elastic unit that is interlocked with a buttress, according to an embodiment of the present disclosure.

FIG. 9A is a perspective view illustrating a coupling protrusion of an elastic unit that is interlocked with a buttress, according to an embodiment of the present disclosure.

Figure 9B:
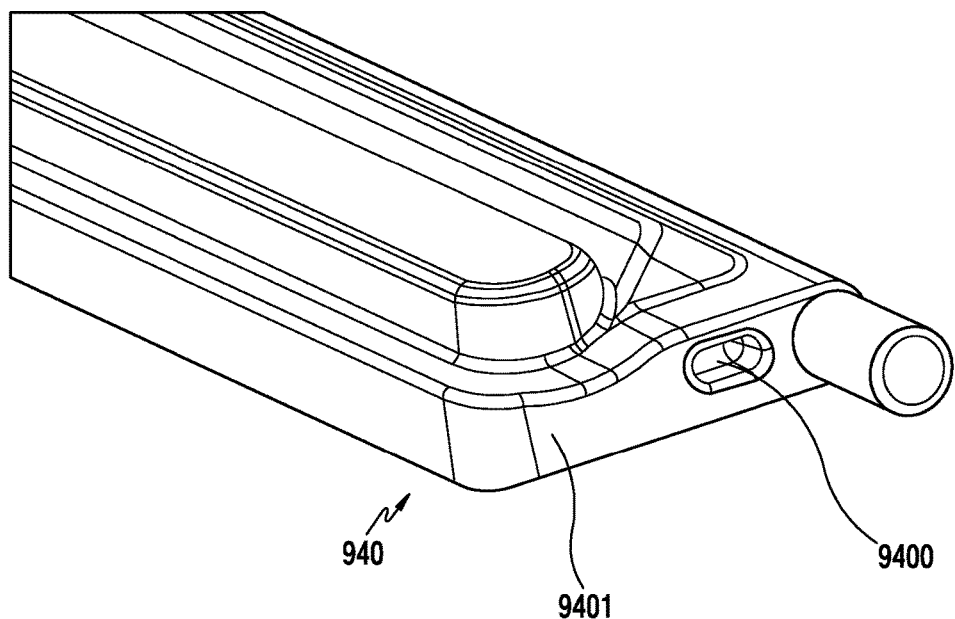
FIG. 9B is a perspective view illustrating a coupling recess of a buttress, according to an embodiment of the present disclosure.

FIG. 9B is a perspective view illustrating a coupling recess of a buttress, according to an embodiment of the present disclosure.

Referring to FIGS. 9A and 9B, the rocking or movement of the inclined second electronic device in the cradled state may be minimized by the coupling structure between a buttress 940 and an elastic unit 914.

According to an embodiment in the cradled state, the elastic unit 914 may include a coupling projection 9140 formed on one side face 9141 thereof, which may face the buttress 940. A coupling recess 9400 may be formed on one side face 9401 of the buttress 940, which may face the elastic unit 914. The rocking or movement of the second electronic device may be generated during an input operation in the typing mode. In the state where the coupling projection 9140 and the coupling recess 9400 are coupled to each other, the second electronic device, in the typing mode, may be substantially fixed in the inclined state according to the coupling structure.

The elastic unit 914 may include a rubber material, and the coupling projection 9140 made of the rubber material may be engaged with, or disengaged from, the coupling recess 9400 by force. It is described that one coupling projection 9140 is formed on one side face 9141 of the elastic unit 914, but the present disclosure is not limited to such. For example, according to the moving track of the coupling recess 9400, two or three coupling projections 9140 may be formed. In addition, the coupling projection may be formed on the buttress, and the coupling recess may be formed on the elastic unit.

Figure 10A:
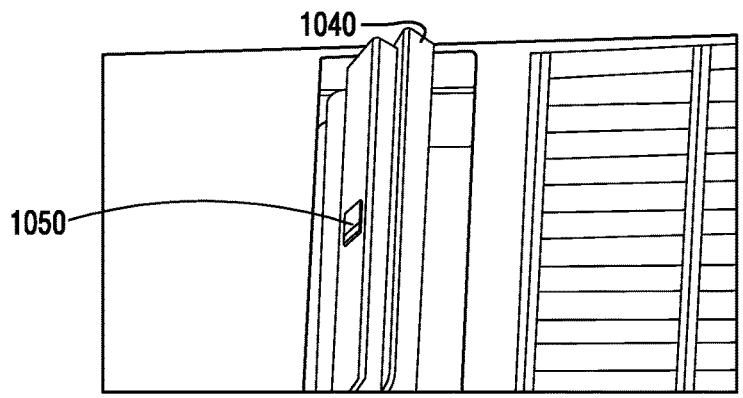
FIG. 10A is a perspective view illustrating a typing mode of a buttress, according to an embodiment of the present disclosure.

FIG. 10A is a perspective view illustrating a typing mode of a buttress, according to an embodiment of the present disclosure.

Figure 10B:
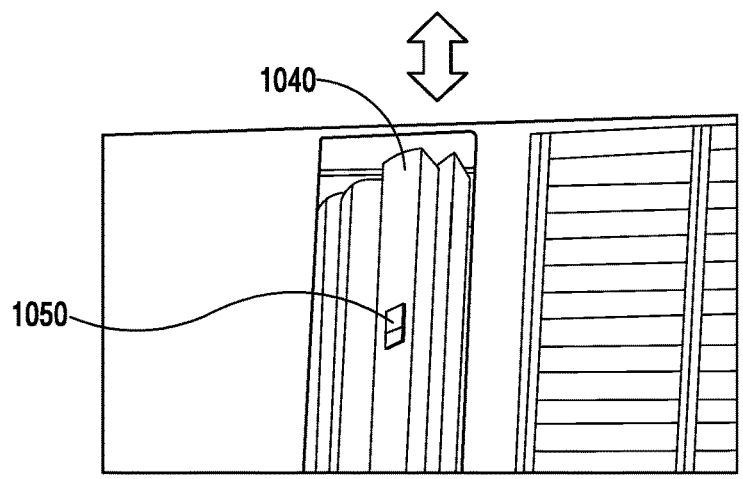
FIG. 10B is a perspective view illustrating a display viewing mode of a buttress, according to an embodiment of the present disclosure.

FIG. 10B is a perspective view illustrating a display viewing mode of a buttress, according to an embodiment of the present disclosure.

Figure 10C:
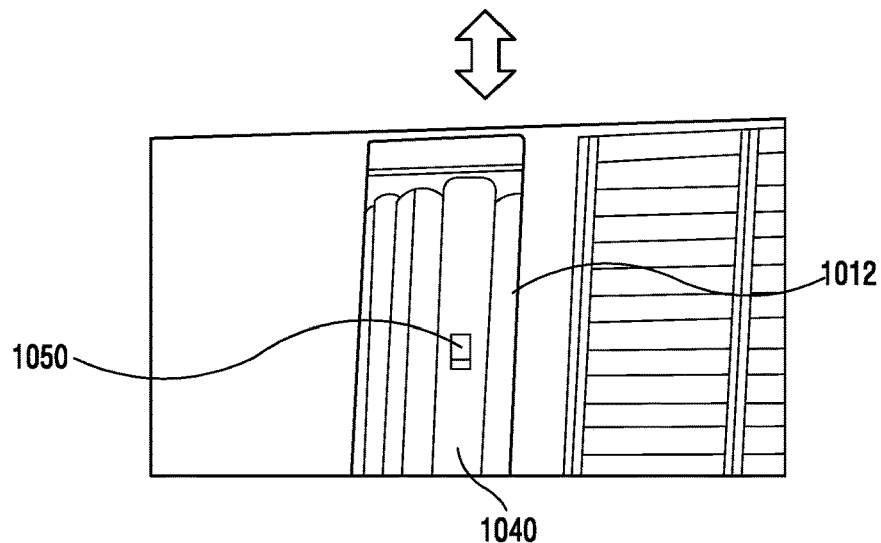
FIG. 10C is a perspective view illustrating a closed state of a buttress, according to an embodiment of the present disclosure.

FIG. 10C is a perspective view illustrating a closed state of a buttress, according to an embodiment of the present disclosure.

Referring to FIGS. 10A to 10C, a buttress 1040 may be rotated according to a mode. In the typing mode, the buttress 1040 may be in the state illustrated in FIG. 10A. In the typing mode, the buttress 1040 may be rotated frequently. A connection unit of the second electronic device cradled to be inclined may be connected to a connection device 1050 provided in the buttress 1040, and may maintain the connection state. Maintaining the connection state may be achieved due to the coupling structure between the coupling recess and the coupling projection.

In the display viewing mode, the buttress 1040 may be in the state illustrated in FIG. 10B. In the display viewing mode, the buttress 1040 may be rotated. A connection unit of the second electronic device cradled to be inclined may be connected to a connection device 1050 provided in the buttress 1040, and may maintain the connection state. Maintaining the connection state may be achieved due to the self-weight of the second electronic device.

In the closed state, the buttress 1040 may be in the state illustrated in FIG. 10C. In the closed state, the buttress 1040 may be safely accommodated in an accommodation portion 1012. In the accommodated state, the magnets provided on the second face of the buttress 1040 may be coupled to a metal sheet positioned on the bottom of the accommodation portion 1012, thereby preventing movement of the buttress 1040.

Figure 11A:
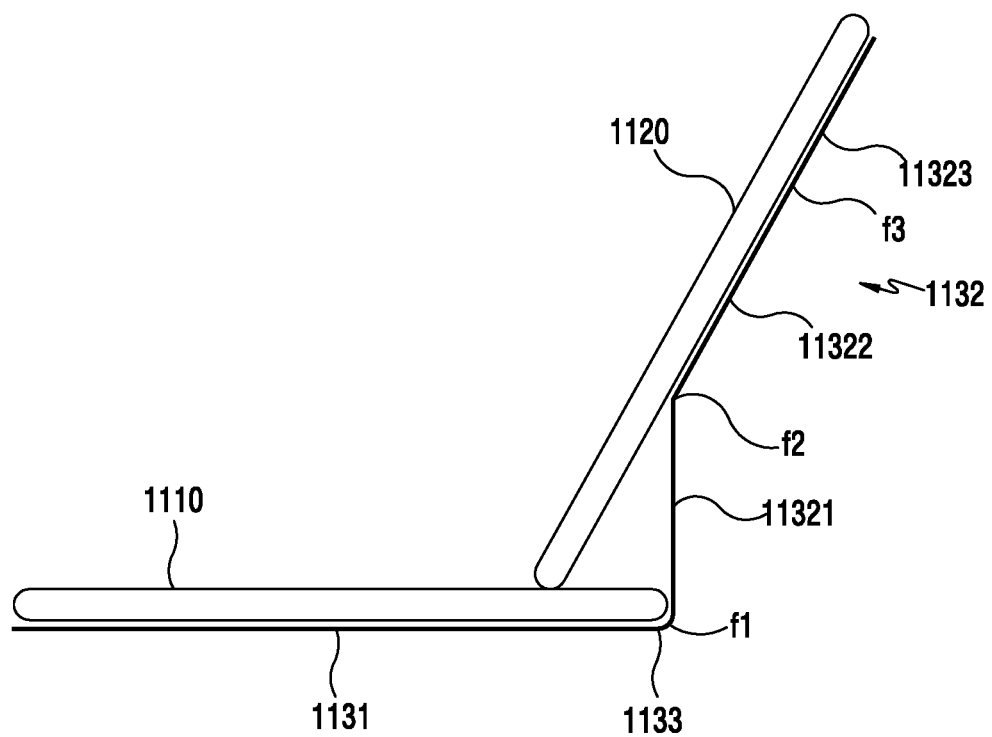
FIG. 11A is a side view illustrating a second portion which supports an electronic device during display viewing mode, according to an embodiment of the present disclosure.

FIG. 11A is a side view illustrating a second portion 1132 which supports an electronic device during display viewing mode, according to an embodiment of the present disclosure.

Figure 11B:
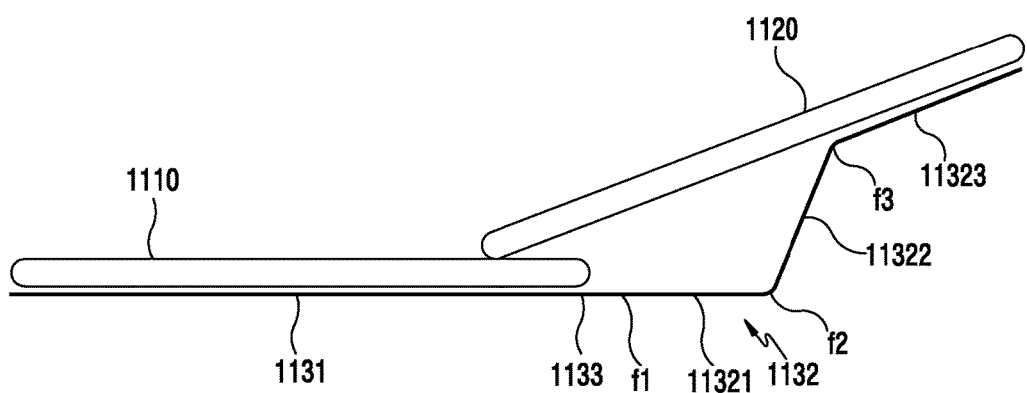
FIG. 11B is a side view illustrating a second portion which supports an electronic device during typing mode, according to an embodiment of the present disclosure.

FIG. 11B is a side view illustrating a second portion 1132 which supports a second electronic device during typing mode, according to an embodiment of the present disclosure.

A first portion 1131 may be detached from/attached to the bottom face of the first electronic device 1110.

Referring to FIG. 11A, in the display viewing mode of an electronic device 1100, in the state where the second electronic device 1120 is inclined at an angle of about 65 to 70 degrees and connected with a buttress disposed on the first electronic device 1110, the rear face of the second electronic device 1120 may be in close contact with second and third supports 11322 and 11323 and a first support 11321 may support the second electronic device 1120. The first support 11321 may be folded about a first folding axis f1, and the second support 11322 may be folded about a second folding axis f2. In the flat state, the second support 11322 and the third support 11323 may be in close contact with the rear face of the second electronic device 1120. For the close contact state, a magnetic force may be used.

Referring to FIG. 11B, in the typing mode of the electronic device 1100, in the state where the second electronic device 1120 is inclined at an angle of about 15 to 20 degrees and connected with the buttress disposed on the first electronic device 1110, the rear face of the second electronic device 1120 may be in close contact with the third support 11323 and the first and second supports 11321 and 11322 may support the second electronic device 1120. The second support 11322 may be folded about the second folding axis f2, and the third support 11323 may be folded about a third folding axis f3. In the flat state, the first support 11321 may be in close contact with the rear face of the second electronic device 1120. For the close contact state, a magnetic force may be used.

The term "module," as used herein may represent, for example, a unit including a combination of one or two or more of hardware, software, or firmware. The term "module" may be, for example, used interchangeably with the terms "unit", "logic", "logical block", "component", or "circuit" etc. The "module" may be the minimum unit of an integrally constructed component or a part thereof. The "module" may be also the minimum unit performing one or more functions or a part thereof. The "module" may be implemented mechanically or electronically. For example, the "module" may include at least one of an application-specific integrated circuit (ASIC) chip, field programmable gate arrays (FPGAs) and a programmable-logic device performing operations known in the art or to be developed in the future.

At least a part of an apparatus (e.g., modules or functions thereof) or method (e.g., operations) according to an embodiment of the present disclosure may be, for example, implemented as instructions stored in a computer-readable storage medium in a form of a programming module. In the case that the instruction is executed by a processor, and the processor may perform functions corresponding to the instructions. The non-transitory computer-readable storage media may be the memory 130, for instance.

The non-transitory computer-readable recording medium may include a hard disk, a floppy disk, and a magnetic medium (e.g., a magnetic tape), an optical medium (e.g., a compact disc read only memory (CD-ROM) and a digital versatile disc (DVD)), a magneto optical medium (e.g., a floptical disk), and a hardware device (e.g., a read only memory (ROM), a random access memory (RAM), a flash memory, etc.). Also, the program instruction may include not only a mechanical language code such as a code made by a compiler but also a high-level language code executable by a computer using an interpreter, etc. The aforementioned hardware device may be constructed to operate as one or more software modules in order to perform operations of the present disclosure, and vice versa.

The module or programming module according to an embodiment of the present disclosure may include at least one or more of the aforementioned constituent elements, or omit some of the aforementioned constituent elements, or further include additional other constituent elements. Operations carried out by the module, the programming module or the other constituent elements according to an embodiment of the present disclosure may be executed in a sequential, parallel, repeated or heuristic method. Also, some operations may be executed in different order or may be omitted, or other operations may be added.

While the present disclosure has been shown and described with reference to certain embodiments thereof, it will be apparent to those skilled in the art that the present disclosure is not limited to these embodiments, and various changes in form and details may be made therein without departing from the spirit and scope of the present disclosure as defined by the appended claims and their equivalents.

What is claimed is:

1. An electronic device including an input device and an exterior cover, the electronic device comprising:
    a buttress disposed on a front face of the input device, connected to an output device in an inclined state, and configured to support the inclined output device,
    wherein the exterior cover includes a first portion on which the input device is mounted and a second portion folded one or more times to support the inclined output device,
    wherein the buttress is disposed in an accommodation portion formed on the front face of the input device to be rotatable about a hinge axis,
    wherein at least one elastic unit is disposed on at least one end of opposite ends of the accommodation portion and facing the buttress, and at least a portion of the at least one elastic unit engages with at least a portion of the buttress according to a rotational movement of the buttress, and
    wherein the buttress includes:
    a first outer face exposed to the outside that includes at least one connection terminal disposed in a central region to be elastically movable; and
    a second inner face opposite to the first outer face that includes a plurality of magnets that are mounted at intervals to provide a force to minimize a rocking or moving of the buttress.

2. The electronic device of claim 1, wherein the second portion includes at least one opening, and
    the at least one opening is coupled with an exterior component of the output device to fix the output device in an inclined and cradled state.

3. The electronic device of claim 2, wherein the exterior component is a protruding type exterior component that protrudes from a rear face of the output device.

4. The electronic device of claim 2, wherein the exterior component includes an optical component.

5. The electronic device of claim 1, wherein the buttress disposed in the accommodation portion is spaced apart from a first folding axis between the first and second portions on the front face of the input device and extends in a direction parallel to the first folding axis.

6. The electronic device of claim 5, wherein the buttress is configured to connect the inclined output device to the input device, support the inclined output device, and minimize movement of the inclined state of the output device.

7. The electronic device of claim 6, wherein the plurality of magnets are mounted at regular intervals along a longitudinal direction in the second inner face.

8. The electronic device of claim 1, wherein a metal sheet is formed on a bottom of the accommodation portion through insert injection molding, and is coupled to the plurality of magnets to fix the buttress in the accommodation portion.

9. The electronic device of claim 8, wherein the buttress further includes a connection member, the connection member is attached to the second inner face of the buttress and an inner structure of the output device.

10. The electronic device of claim 1, wherein the device configured to minimize the movement includes:
   a coupling projection formed on a side face of the buttress, which faces the at least one elastic unit; and
   a coupling recess formed on a side face of the at least one elastic unit, which faces the side face of the buttress, the coupling recess being coupled to the coupling projection.

11. The electronic device of claim 1, wherein the second portion is divided into first, second, and third supports by first, second, and third folding axes, and the first, second, and third supports are configured to be foldable along the first, second, and third folding axes.

12. The electronic device of claim 11, wherein, in a display viewing mode, in a state where the output device is connected with the buttress, a rear face of the output device is in close contact with the second and third supports, and the first support supports the output device in the inclined state.

13. The electronic device of claim 11, wherein, in a typing mode, in a state where the output device is connected with the buttress, a rear face of the output device is in close contact with the third support, and the first and second supports support the output device in the inclined state.

14. The electronic device of claim 11, wherein the second portion further includes at least one magnet disposed thereon such that the second portion is coupled with a rear face of the output device by a magnetic force.

15. The electronic device of claim 14, wherein the at least one magnet includes:
   at least one first magnet disposed on the first support;
   at least one second magnet disposed on the second support; and
   at least one third magnet disposed on the third support.

16. The electronic device of claim 15, wherein the third support further includes at least one fourth magnet disposed around an opening.

17. The electronic device of claim 15, wherein the output device includes an exterior case of which at least a portion is made of a metallic material, and is maintained in a close contact state with the at least one second magnet by a magnetic force.

18. An electronic device comprising:
   a keyboard;
   a display;
   an exterior cover including a first portion on which the keyboard is mounted and a second portion folded one or more times to support the display in an inclined state; and
   a buttress rotatably exposed about a hinge axis in an accommodation portion formed on the keyboard, and maintaining a connection state with the display that is supported in the inclined state,
   wherein, when the display is supported on the keyboard in the inclined state, a connection state may be maintained between the display and the second portion,
   wherein at least one elastic unit is disposed on at least one end of opposite ends of the accommodation portion and facing the buttress, and at least a portion of the at least one elastic unit engages with at least a portion of the buttress according to a rotational movement of the buttress, and
   wherein the buttress includes:
   a first outer face exposed to the outside that includes at least one connection terminal disposed in a central region to be elastically movable, and
   a second inner face opposite to the first outer face that includes a plurality of magnets that are mounted at intervals to provide a force to fix minimize a rocking or moving of the buttress.

19. The electronic device of claim 18, wherein the plurality of magnets are mounted at regular intervals along a longitudinal direction in the second inner face.

* * * * *